Figure 1:
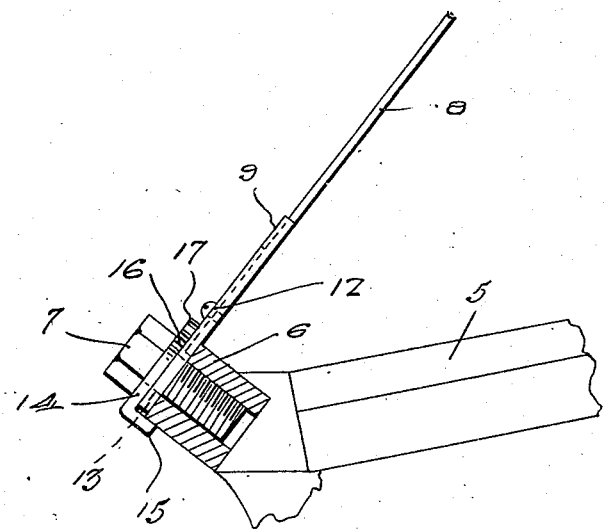

Oct. 12, 1926.

A. J. VILLENEUVE

GRIPPER BAR FOR PRINTING PRESSES

Original Filed Feb. 13, 1926

1,603,224

Inventor

A. J. Villeneuve

By Clarence A. O'Brien

Attorney

Patented Oct. 12, 1926.

1,603,224

UNITED STATES PATENT OFFICE.

ALBERT J. VILLENEUVE, OF CLINTONVILLE, WISCONSIN.

GRIPPER BAR FOR PRINTING PRESSES.

Original application filed February 13, 1926, Serial No. 88,058. Divided and this application filed June 12, 1926. Serial No. 115,423.

The invention relates to an improved gripper bar for use on platen printing presses, and the subject matter of this invention has been divided from my pending application, bearing Serial No. 88,058, filed February 13, 1926.

The principal object of the invention is to provide an adjustable structure capable of allowing the gripper bar to be adjusted or swung in relation to the gripper holder so as to extend at various angles therefrom and also permit the gripper bar to be lengthened or shortened as may be desired.

In the drawing:—

Figure 2:
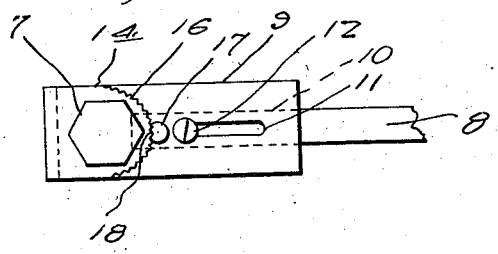

Figure 1 is a sectional view through a gripper holder showing one of my improved gripper bars, and Fig. 2 is a plan view of the gripper bar.

Referring to the drawing in detail, it will be seen that 5 designates a platen having the usual gripper holder 6 mounted thereon with a plurality of screws 7 engageable therewith for holding the gripper bars in place. I have just illustrated the mounting of a single gripper bar, as this will suffice for the purposes of the present invention, wherein the improvement lies in the gripper bar per se.

The numeral 8 designates an elongated shank forming the gripper bar proper and 9 designates a plate which is provided on its surface with an elongated longitudinal extending groove 10 and a similarly extending slot 11. The shank 8 is slidably receivable in the groove 10 and a screw 12 pierces the slot 11 and engages the shank 8 so that said shank 8 may be held in different adjusted positions in relation to the plate 9 for lengthening or shortening the gripper bar.

The plate 9 is provided with an aperture or opening 13. A washer 14 is provided with a flange 15 for engaging a side of the gripper holder to prevent the turning of this washer when the screw 7 is engaged therethrough. The screw 7 also extends through the aperture 13. One edge of the washer 14 is arcuate and provided with a series of teeth 16.

A stud 17 rises from the plate 9 and is provided with teeth 18 engageable with teeth 16. By loosening the screw 7 and raising the washer 14 to disengage teeth 16 with the teeth 18 of the stud 17, it will be seen that the plate 7 may be swung to the desired angle in relation to the gripper holders 6, and when the screw 7 is tightened, the teeth 16 of the washer 14 will engage the teeth 18 of the stud 17, thereby locking the plate 9 in the adjusted position.

It is thought that the construction, operation, and advantages of this invention will now be clearly understood without a more detailed description thereof. The present embodiment of the invention has been disclosed in detail, since in actual practice, it attains the features of advantage enumerated as desirable in the statement of the invention and the above description. It will be apparent that changes in the details of construction, and in the combination and arrangement of parts may be resorted to if desired, without departing from the spirit or scope of the invention as hereinafter claimed, or sacrificing any of its advantages.

Having thus described my invention, what I claim as new is:—

1. A gripper bar of the class described including, in combination, a plate provided with an opening for receiving the screw of a gripper holder, and provided with a longitudinally extending groove and a coincident slot, a stud extending from the plate and provided with teeth, a washer having an opening for receiving said screw of the gripper holder and adapted to be superimposed over the plate, said wall portion provided with a flange for engaging one side of the gripper holder and with an arcuate series of teeth for engaging the teeth of the stud, an elongated shank engageable in the groove, and a screw piercing the slot and engaged with the shank for holding said shank in different adjusted positions in relation to the plate.

2. In combination with a gripper bar, a washer provided with an opening for receiving the screw of a gripper holder, said washer provided with an arcuate series of teeth, and a stud provided with teeth engageable with the teeth of the washer and mounted on the bar.

In testimony whereof I affix my signature.

ALBERT J. VILLENEUVE.